(12) United States Patent
Fan et al.

(10) Patent No.: US 9,965,773 B2
(45) Date of Patent: May 8, 2018

(54) MAP-BASED ADVERTISING SYSTEM (71) Applicant: MOVE, INC., Westlake Village, CA (US)

(72) Inventors: Duke Fan, Westlake Village, CA (US); Yi-Fang Yen, Westlake Village, CA (US); Michael James Leavy, Santa Cruz, CA (US); Catherine Elizabeth Tiritoglu, Sunnyvale, CA (US)

(73) Assignee: Move, Inc., Westlake Village, CA (US)

( * ) Notice: Subject to any disclaimer, the term of this patent is extended or adjusted under 35 U.S.C. 154(b) by 909 days.

(21) Appl. No.: 13/748,309

(22) Filed: Jan. 23, 2013

(65) Prior Publication Data
US 2014/0207574 A1    Jul. 24, 2014

(51) Int. Cl.
G06Q 30/02    (2012.01)
G09B 29/00    (2006.01)

(52) U.S. Cl.
CPC ..... *G06Q 30/0259* (2013.01); *G06Q 30/0269* (2013.01); *G09B 29/007* (2013.01)

(58) Field of Classification Search
None
See application file for complete search history.

(56) References Cited

U.S. PATENT DOCUMENTS

2008/0086356 A1* 4/2008 Glassman et al. .............. 705/10
2009/0263026 A1* 10/2009 Verne et al. ................... 382/209

* cited by examiner

*Primary Examiner* — Sam Refai
*Assistant Examiner* — Alexandru Cirnu
(74) *Attorney, Agent, or Firm* — Alston & Bird LLP (57) ABSTRACT

A method, apparatus and computer program product are provided for implementing a map-based advertising system. In one example embodiment, a method is provided that includes causing a graphical geographic representation of a bounded area to be displayed, receiving advertising content comprising at least one location, and determining whether the location lies within the bounded area. The method further includes causing at least a portion of the advertising content to be displayed and causing a representation of the at least one location to be displayed within the graphical geographic representation of the bounded area in an instance in which the location lies within the bounded area.

20 Claims, 6 Drawing Sheets

MAP-BASED ADVERTISING SYSTEM

FIELD OF APPLICATION

Embodiments of the present invention relate generally to systems, methods, and computer program products for providing advertising content, and more particularly to systems, methods, and computer program products for providing advertising content via a map-based advertising system.

BACKGROUND

Standalone and browser-based map and navigation applications continue to become more and more ubiquitous, especially in mobile electronic devices. The increasing popularity of such applications has led to increased attention from advertisers, who want to leverage them to deliver relevant advertisements to users. To date, such advertisement delivery has been implemented as a location-based service (LBS). That is, advertisements are delivered to the user of a map or navigation application based on the user's location. In some cases, however, the user may be prevented from seeing relevant advertisement or the advertisements which are delivered may not be useful or relevant to the user.

Accordingly, it may be desirable to present advertising content to users in a way that is not dependent solely on the user's location.

SUMMARY

A method, apparatus and computer program product are therefore provided according to an example embodiment of the present invention for implementing a map-based advertising system. In this regard, the method, apparatus, and computer program product of one embodiment may allow advertisements to be displayed to a user even when those advertisements fall outside the area on a map that a user is currently viewing. When an advertisement has a location that falls outside of the location that the user is viewing, an indication of this map may be presented and the indication may allow the user to adjust the current view so that the advertisement is viewable.

Thus, according to an example embodiment, a method is provided that includes causing a graphical geographic representation of a bounded area to be displayed and receiving advertising content comprising at least one location. The method of this embodiment further includes determining whether the location lies within the bounded area and, in an instance in which the at least one location does not lie within the bounded area, causing an indication that the location lies outside the bounded area to be presented. According to a further embodiment, the indication may comprise a selectable element, and the method may further include receiving selection of the selectable element and, in response, causing the bounded area to be modified such that the at least one location lies within the bounded area.

According to another example embodiment, an apparatus is provided. The apparatus includes at least one processor and at least one memory storing program code, the memory and program code being configured to, with the at least one processor, direct the apparatus to at least cause a graphical geographic representation of a bounded area to be displayed and receive advertising content comprising at least one location. The apparatus of this embodiment is further caused to determine whether the location lies within the bounded area and, in an instance in which the at least one location does not lie within the bounded area, cause an indication that the location lies outside the bounded area to be presented. According to a further embodiment, the indication may comprise a selectable element, and the apparatus may be further caused to receive selection of the selectable element and, in response, cause the bounded area to be modified such that the at least one location lies within the bounded area.

According to yet another example embodiment, a computer program product is provided. The computer program product includes a non-transitory computer readable storage medium having program code portions embodied therein, the program code portions being configured to, upon execution, direct an apparatus to at least cause a graphical geographic representation of a bounded area to be displayed and receive advertising content comprising at least one location. The program code portions of this embodiment are further configured to, upon execution, cause the apparatus to determine whether the location lies within the bounded area and, in an instance in which the at least one location does not lie within the bounded area, cause an indication that the location lies outside the bounded area to be presented. According to a further embodiment, the indication may comprise a selectable element, and the program code portions may be further configured to, upon execution, cause the apparatus to receive selection of the selectable element and, in response, cause the bounded area to be modified such that the at least one location lies within the bounded area.

According to a still further example embodiment, an apparatus is provided that includes means for causing a graphical geographic representation of a bounded area to be displayed and means for receiving advertising content comprising at least one location. The apparatus of this embodiment further includes means for determining whether the location lies within the bounded area and means for causing, in an instance in which the at least one location does not lie within the bounded area, an indication that the location lies outside the bounded area to be presented. According to a further embodiment, the indication may comprise a selectable element, and the apparatus may further include means for receiving selection of the selectable element and means for causing, in response to receiving the selection, the bounded area to be modified such that the at least one location lies within the bounded area.

BRIEF DESCRIPTION OF THE SEVERAL VIEWS OF THE DRAWING(S)

Reference will now be made to the accompanying drawings, which are not necessarily drawn to scale.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As discussed in the background section, advertisement delivery has, to date, been implemented as a location-based service (LBS). For example, the user of a map or navigation application may be using the application on a mobile electronic device with a GPS or other technology configured to determine the user's location. The user's location is sent from the user's device to an advertisement server, which looks up advertisements for goods or services near the user and sends the relevant advertisements to the user's device for display.

Implementing an advertisement delivery scheme as an LBS may be problematic in several respects. For example, traditional location-based advertisement delivery services (LBADS) may not necessarily provide the most relevant advertisements to users in all situations. For instance, users frequently use map and/or navigation applications because they intend to leave their current location and are looking for assistance in doing so. Thus, delivering advertisements based on a user's current location may not always be ideal. Finally, by limiting advertisements to a user's immediate area, advertisers may not be getting the maximum value out of their advertising dollars, as users may not be exposed to relevant advertisements simply because they are not located closely enough to the advertisement's origin.

Accordingly, the present application is generally directed to systems, methods, and computer program products for delivering advertising content to a user who is viewing a graphical geographic representation, e.g., a map, such as via a browser-based or standalone map or navigation application. Embodiments of such map-based advertising (MBA) systems, methods, and computer program products can be configured to facilitate the provision of advertising content associated with a location to a user who is viewing a graphical geographic representation of a bounded area and, if the location is outside of the bounded area, to cause an indication that off-screen advertising content is available to be presented. The indication may, for example, be selectable, and upon the user selecting the indication, the map view may be adjusted so that the user can see the advertisement. In this way, more relevant advertisements may be presented to the user, as the user is informed of advertisements which are located outside of the bounded area they are currently viewing, and the effective range of any given advertisement may be expanded. Thus, example embodiments of the MBA system may provide a more effective advertisement delivery system which better suits the needs of both users and advertisers. Many other features and benefits may be provided by the MBA systems, methods, and computer program products, as will be discussed in greater detail below.

In this regard, embodiments of the present invention will be described more fully hereinafter with reference to the accompanying drawings. It should be understood that these drawings show some, but not all, embodiments of the invention. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, processed and/or stored in accordance with embodiments of the present invention. Thus, use of any such terms should not be taken to limit the spirit and scope of embodiments of the present invention.

Additionally, as the term will be used herein, "circuitry" may refer to hardware-only circuit implementations (e.g., implementations in analog circuitry and/or digital circuitry); combinations of circuits and computer program product(s) including software and/or firmware instructions stored on one or more computer readable memories that work together to cause an apparatus to perform one or more functions described herein; and circuits, such as, for example, one or more microprocessors or portions of a microprocessors, that require software or firmware for operation even if the software or firmware is not physically present. This definition of "circuitry" is applicable to all uses of this term, including in any claims. As another example, the term "circuitry" also includes implementations comprising one or more processors and/or portion(s) thereof and accompanying software and/or firmware. As another example, the term "circuitry" also includes, for example, an integrated circuit or applications processor integrated circuit for a portable communication device or a similar integrated circuit in a server, a network device, and/or other computing device.

As defined herein, a "computer-readable storage medium" refers to a non-transitory physical storage medium (e.g., volatile or non-volatile memory device) and can be differentiated from a "computer-readable transmission medium," which refers to an electromagnetic signal.

Figure 1:
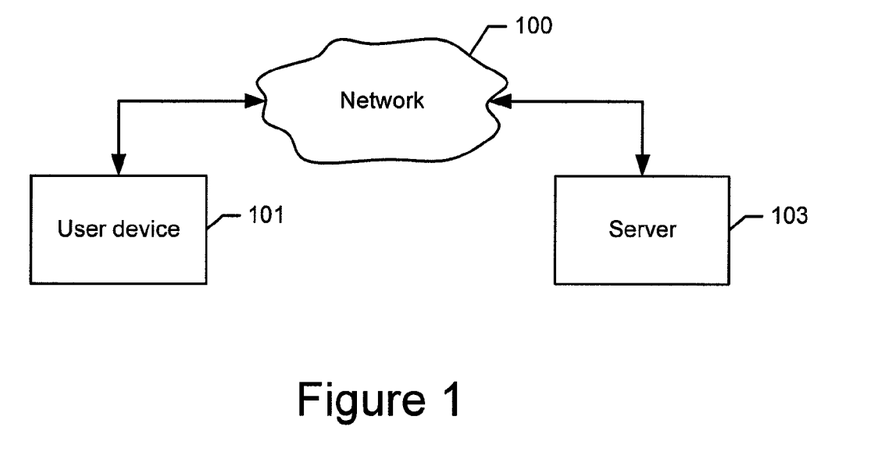
FIG. 1 is a schematic representation of a map-based advertising (MBA) system configured in accordance with an example embodiment.

FIG. 1 illustrates a block diagram of an MBA system. While FIG. 1 illustrates one example of a configuration of an MBA system, numerous other configurations may be used to implement embodiments of the present invention. With reference to FIG. 1, however, the MBA system may include a user device 101 and a network entity, such as a server 103. The user device 101 may be any device that is configured to communicate over one or more networks, such as the Internet 100. For example, the user device 101 may be a mobile terminal, such as a mobile telephone, PDA, pager, laptop computer, tablet computer, or any of numerous other hand held or portable communication devices, computation devices, content generation devices, content consumption devices, or combinations thereof. The server 103 may be any type of network-accessible device that includes storage and may be configured to communicate with the user device 101 over one or more networks, such as the Internet 100. The server 103 may store account information, geographic information, advertising content, and any other conceivable types of content, data or the like which may, for example, be used by the server 103 or provided to the user device 101 during use of the MBA system. The server 103 may also communicate with other servers or devices, such as other user devices, as well as other servers or data terminals including servers and systems providing geographic, advertising, or other types of data, over one or more networks, such as the Internet 100. The user device 101 and/or server 103 may include or be associated with an apparatus 200, such as shown in FIG. 2, configured in accordance with embodiments of the present invention, as described below.

As shown in FIG. 1 and mentioned above, the user device 101 and server 103 may communicate with one another via a common network, such as the Internet 100. The user device 101 and the server 103 may connect to the common network, e.g., the Internet 100, via wired or wireless means, such as via one or more intermediate networks. For example, the user device 101 and/or server 103 may connect with the common network, e.g., the Internet 100, via wired means such as Ethernet, USB (Universal Serial Bus), or the like, or via wireless means such as, for example, WI-FI, BLUETOOTH, or the like, or by connecting with a wireless cellular network, such as a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network, or other type of network.

Example embodiments of the invention will now be described with reference to FIG. 2, in which certain elements of an apparatus 200 for carrying out various functions of the MBA system are depicted. As noted above, in order to implement the various functions of the MBA system, the apparatus 200 of FIG. 2 may be employed, for example, in conjunction with either or both of the user device 101 and the server 103 of FIG. 1. However, it should be noted that the apparatus 200 of FIG. 2 may also be employed in connection with a variety of other devices, both mobile and fixed, in order to implement the various functions of the MBA system and therefore, embodiments of the present invention should not be limited to those depicted. It should also be noted that while FIG. 2 illustrates one example of a configuration of an apparatus 200 for implementing the functions of the MBA system, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Figure 2:
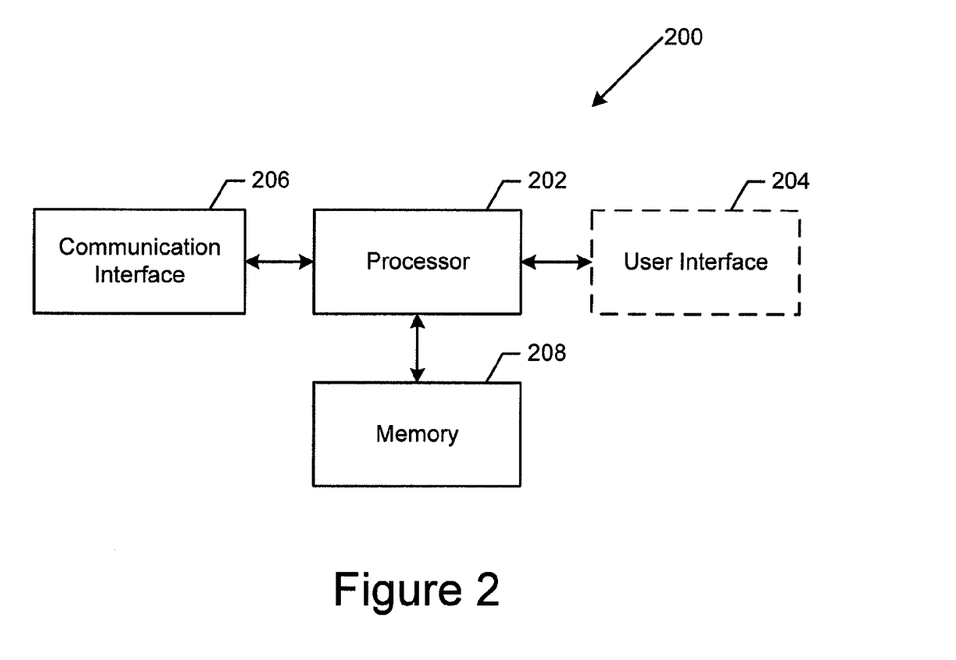
FIG. 2 is a block diagram of an apparatus that may be embodied by or associated with an electronic device and may be configured to implement example embodiments of the present invention.

Referring now to FIG. 2, the apparatus 200 for implementing the various functions of the MBA system may include or otherwise be in communication with a processor 202, a communication interface 206, and a memory device 208. As described below and as indicated by the dashed lines in FIG. 2, the apparatus 200 may also include a user interface 204, such as when the apparatus 200 is embodied by or otherwise associated with a user device 101. In some embodiments, the processor 202 (and/or co-processors or other processing circuitry assisting or otherwise associated with the processor 202) may be in communication with the memory device 208 via a bus configured to pass information among components of the apparatus 200. The memory device 208 may, for example, include one or more volatile and/or non-volatile memories. The memory device 208 may be configured to store information, data, content, applications, instructions, or the like, for enabling the apparatus 200 to carry out various functions in accordance with an example embodiment of the present invention. For example, the memory device 208 may be configured to store instructions, such as program code instructions, that, when execution by the processor 202, cause the apparatus 200 to carry out various operations.

The processor 202 may be embodied in a number of different ways. For example, the processor 202 may be embodied as one or more of a variety of hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 202 may include one or more processing cores configured to perform independently. A multi-core processor may enable multiprocessing within a single physical package. Additionally or alternatively, the processor 202 may include one or more processors configured in tandem via the bus to enable independent execution of instructions, pipelining and/or multithreading.

In an example embodiment, the processor 202 may be configured to execute instructions stored in the memory device 208 or otherwise accessible to the processor 202. Alternatively or additionally, the processor 202 may be configured to execute hard coded functionality. As such, whether configured by hardware or software methods, or by a combination thereof, the processor 202 may represent an entity (e.g., physically embodied in circuitry) capable of performing operations according to an embodiment of the present invention while configured accordingly. Thus, for example, when the processor 202 is embodied as an ASIC, FPGA or the like, the processor 202 may be specifically configured hardware for conducting the operations described herein. Alternatively, as another example, when the processor 202 is embodied as an executor of software instructions, the instructions may specifically configure the processor 202 to perform the algorithms and/or operations described herein when the instructions are executed. However, in some cases, the processor 202 may be a processor of a specific device (e.g., the user device 101 or server 103) configured to employ an embodiment of the present invention by further configuration of the processor 202 by instructions for performing the algorithms and/or operations described herein. The processor 202 may include, among other things, a clock, an arithmetic logic unit (ALU) and logic gates configured to support operation of the processor 202.

Meanwhile, the communication interface 206 may be any means such as a device or circuitry embodied in either hardware or a combination of hardware and software that is configured to receive and/or transmit data from/to a network, such as the Internet 100, and/or any other device or module in communication with the apparatus 200. In this regard, the communication interface 206 may include, for example, an antenna (or multiple antennas) and supporting hardware and/or software for enabling communications with a wireless communication network. Additionally or alternatively, the communication interface 206 may include the circuitry for interacting with the antenna(s) to cause transmission of signals via the antenna(s) or to handle receipt of signals received via the antenna(s). In some environments, the communication interface 206 may alternatively or also support wired communication. As such, for example, the communication interface 206 may include a communication modem and/or other hardware/software for supporting communication via cable, digital subscriber line (DSL), universal serial bus (USB) or other mechanisms.

In some embodiments, such as instances in which the apparatus 200 is embodied by the user device 101, the apparatus 200 may include a user interface 204 in communication with the processor 202 to receive indications of user input and to cause audible, visual, mechanical or other output to be provided to the user. As such, the user interface 204 may, for example, include a keyboard, a mouse, a joystick, a display, a touch screen(s), touch areas, soft keys, a microphone, a speaker, or other input/output mechanisms.

The processor 202 may be configured to control one or more functions of one or more user interface elements through computer program instructions (e.g., software and/or firmware) stored on a memory accessible to the processor 202 (e.g., memory device 208). In other embodiments, however, such as in instances in which the apparatus 200 is embodied by the server 103, the apparatus 200 may not include a user interface 204, but may instead be in communication with a user interface of the user device 101, such as via a common network such as the Internet 100.

Figure 3:
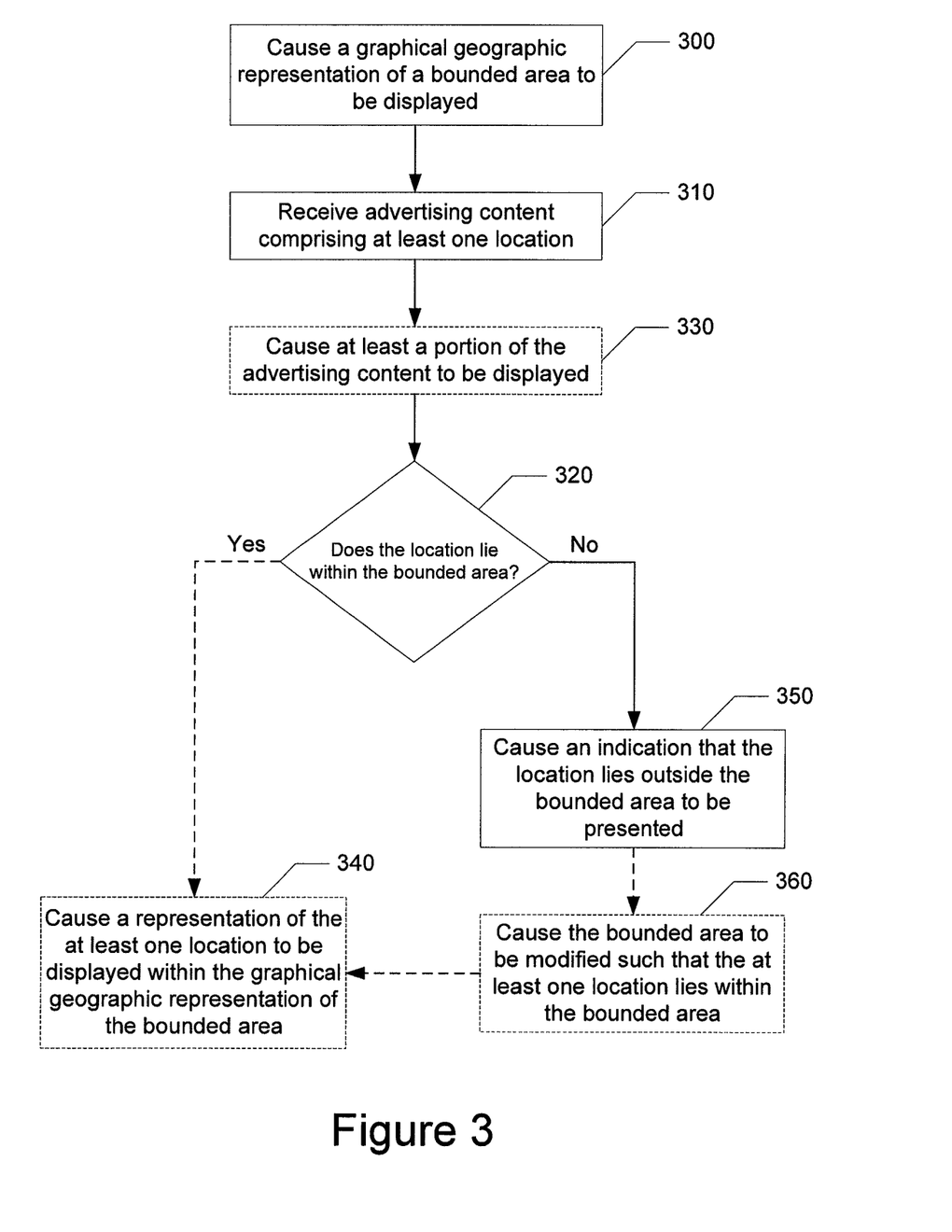
FIG. 3 is a flowchart illustrating operations performed in accordance with an example embodiment of the present invention.

Referring now to FIG. 3, various operations of the MBA system are depicted. As described below, the operations of FIG. 3 may be performed by an apparatus 200, such as shown in FIG. 2, embodied by or otherwise associated with the user device 101. In this regard, the apparatus 200 may include means, such as the processor 202, the memory 208, the user interface 204, the communication interface 206 and/or the like, for causing a graphical geographic representation of a bounded area to be displayed. See operation 300. The graphical geographic representation may, for example, comprise a map. The bounded area may, for example comprise the portion of the graphical geographic representation which is currently viewable, as defined, for example, by the boundaries of a display screen of the user device 101 on which the graphical geographic representation is being presented, or a window provided on a portion of the display screen in which the graphical geographic representation is being presented.

The apparatus 200 embodied by or otherwise associated with the user device 101 may further include means, such as the processor 202, the memory 208, the communication interface 206 and/or the like, for receiving advertising content comprising at least one location. See operation 310. The advertising content may, for example, be received from the server 103, such as via the network 100, and the location may be information representing a provider of the products or services being advertised, such as a location of a brick and mortar establishment associated with the goods and services being advertised. The at least one location may comprise any representation of a location, such as, for example, an address or a portion of an address, geographic coordinates, or other information relating the advertising content to a physical location. In addition to the location, the advertising content may comprise visual content, e.g., graphical or video content; advertiser information such as contact information, slogan(s), or information regarding sales, offers, deals, or the like; a uniform resource locator (URL) associated with the products or services being advertised; audio content; or any other types of content or information.

Multiple versions of the advertising content may be received according to an example embodiment. For example, the advertising content may include full and limited versions of content. Thus, for example, in the case of advertising content which comprises graphical content, large- and reduced-size graphical content may be included. More information may, for example, be included in the large-size graphical content. The various versions of the content may thus be presented, for example, based on a viewing context, an advertiser status, or in response to various user actions. The viewing context may include, for example, a size or orientation of a display screen on which the graphical geographic representation is being viewed. The advertiser status may include whether the advertiser has, for example, paid for a larger advertisement to be presented. User actions which may toggle between the display of large- and reduced-size advertising content may include selecting the advertising content or a location indicator associated with the advertising content. According to example embodiments, any or all of these factors may be taken into account when displaying advertising content for which multiple versions are available.

The advertising content may also include a location indicator, which may, for example, be presented on the graphical geographic representation as an indication of the location with respect to the bounded area displayed to the user. The location indicator may, for example, include any type of content, such as graphical content or advertiser information, and multiple versions of the location indicator may be included, such as a full and limited version, which may be displayed based on a viewing context or in response to various user actions. For example, the location indicator may be a flag, pin, text, letter, number, icon, or any other symbol representing the location with respect to the graphical geographic representation. According to other example embodiments, one or more location indicators may be stored locally, such as in the memory 208 of the apparatus 200, and therefore may not be provided as part of the advertising content. In such a case, the apparatus 200 may determine which of the one or more location indicators should be presented as an indication of the location associated with the advertising content.

Turning now for a moment to an apparatus 200 embodied by or otherwise associated with the server 103, the apparatus 200 may include means, such as the processor 202, the memory 208, the communication interface 206 and/or the like, for causing the advertising content discussed above to be transmitted to the user device 101, e.g., to an apparatus 200 embodied by or otherwise associated with the user device 101. The apparatus 200 may, for example, be configured to cause the advertising content to be transmitted via a network, such as the Internet 100. The apparatus 200 may, according to an example embodiment, cause the advertising content to be transmitted to the user device 101 in response to receiving a search request from the user device 101 or in response to receiving an indication that a search was initiated by the user device 101. Such an indication may, for example, be received from another server configured to handle search requests. According to another example embodiment, the apparatus 200 embodied by or otherwise associated with the server 103 may periodically cause the advertising content to be transmitted to the user device 101 without requiring input from the user, such as by causing the advertising content to be transmitted to the user device 101 every n seconds, minutes, or hours.

According to yet another example embodiment, the apparatus 200 embodied by or otherwise associated with the server 102 may cause the advertising content to be transmitted in response to receiving a request for advertising content from the user device 101. For example, the apparatus 101 embodied by or otherwise associated with the user device 101 may cause one or more advertisement requests to be transmitted to the server 103 for advertising content. According to an example embodiment, one or more advertisement requests may be caused to be sent by the apparatus 200 embodied by or otherwise associated with the user device 101 in response, for example, to a user of the user device 101 causing a search to be initiated (as mentioned above), causing a map or navigation application to be launched, or causing the bounded area that is currently being presented to be changed. The request may also or alternatively be caused to be sent, according to other example embodiments, in response to various other occurrences or in response to various other actions taken by a user of the user device 101.

According to an example embodiment, the advertisement request may include one or more targetable attributes such as, for example, one or more parameters of a search (such as a search which triggered the advertisement request), information about the user, or a location or area. The location or area may, for example comprise the bounded area or an area within a certain proximity of the bounded area or encompassing the bounded area. According to another example embodiment, the location may, for example, be a zip code, city, or even a state or country. Indeed, the location need not be as specific as the geo coordinates or the like relied on by traditional LBADS, because the nature of the MBA system allows relevant advertising content from a larger area to be delivered to a user, such that specific knowledge of a user's location may not be necessary. In this way, certain example embodiments may require the apparatus 200 embodied by or otherwise associated with the server to engage in less complex processing and decision-making than in a traditional LBADS system which may, for example, improve scalability.

Returning now to an apparatus 200 embodied by or otherwise associated with the user device, such a device may further include means, such as the processor 202, the memory 208, the communication interface 206 and/or the like for causing at least a portion of the advertising content to be displayed. See operation 330. According to an example embodiment, the portion of the advertising content may, for example, be displayed proximate to an edge of the graphical geographic representation. For example, according to an example embodiment and in an instance in which the location associated with the advertising content lies outside bounded area, the portion of the advertising content may be displayed proximate to an edge of the graphical geographic representation of the bounded area which corresponds with a direction in which the location lies. In this way, the portion of the advertising content may be used to show the user the direction in which the location lies outside of the bounded area. However, the portion of the advertising content may, according to other embodiments, be displayed anywhere. According to the depicted example embodiment, the apparatus 200 may cause the portion of the advertising content to be displayed regardless of whether a location associated with the advertising content lies within the bounded area. However, according to other example embodiments, the portion of the advertising content may only be displayed in instances in which a location associated with the content lies within the bounded area. The portion of the advertising content may include any type of content. For example, the portion of the advertising content may include a name of the provider of the goods or services, an icon representing the provider of the goods or services, an address of the provider of the goods or services, a description of the goods or services, a slogan of the provider of the goods or services, and/or any combination of two or more of these.

The portion of the advertising content which is caused to be displayed may, according to some example embodiments, comprise one or more selectable elements. Thus, the apparatus 200 embodied by or otherwise associated with the user device 101 may include means, such as those mentioned above, for causing various actions to be performed in response to receiving selection of a selectable element. For example, the apparatus 200 may cause a URL included in the advertising content to be opened via a browser, or may cause additional content, such as video or other multimedia content, to be presented upon selection of the selectable element. According to another example embodiment, the apparatus 200 may cause the advertising content being displayed to toggle between full and limited versions, as discussed above. According to other example embodiments, the apparatus 200 may cause a phone number included in the advertising content to be dialed in response to receiving selection of the selectable element or may cause navigation information (e.g., driving, walking, or public transportation directions from the user's current location to the address of the provider of the goods or services) to be displayed. Any number of other actions may additionally or alternatively be triggered in response to receiving selection of a selectable element according to other example embodiments.

The apparatus 200 embodied by or otherwise associated with the user device 101 may include means, such as those mentioned above, for determining whether at least one location associated with the advertising content lies within the bounded area. See operation 320. The apparatus 200 may further include means, such as the processor 202, the memory 208, the user interface 204 and/or the like for causing a representation of the at least one location to be displayed within the graphical geographic representation of the bounded area in an instance in which at least one location does lie within the bounded area. See operation 340. The representation of the at least one location may, for example, comprise a location indicator which, as discussed above, may comprise any type of content, such as graphical content or advertiser information. According to an example embodiment, multiple versions of the location indicator may be included, such as a full and limited version, which may be displayed based on a viewing context or in response to various user actions.

The location indicator may also comprise one or more selectable elements. Thus, the apparatus 200 embodied by or otherwise associated with the user device 101 may include means, such as those mentioned above, for causing various actions to be performed in response to receiving selection of a selectable element. For example, in response to receiving selection of a selectable element, the apparatus 200 may be caused to toggle between causing display of the limited, e.g., small, version of the location indicator and the full, e.g., large, version of the location indicator. The large version may, for example, include additional content and/or selectable elements configured to cause various actions to be triggered. For example, selectable elements for causing navigation information regarding the location to be presented, for causing a phone number associated with the advertising content to be dialed, for causing a URL included in the advertising content to be opened via a browser, and/or for causing various other actions to be performed may be presented, such as those discussed above in regards to selectable elements associated with the portion of the advertising content. According to another example embodiment, the above-discussed actions may be triggered in response to receiving selection of a selectable element associated with the limited version of the location indicator, e.g., without first toggling from the limited version to the full version.

The apparatus 200 may further include means, such as the processor 202, the memory 208, the user interface 204 and/or the like for causing an indication that the location lies outside of the bounded area to be displayed in an instance in which the at least one location does not lie within the bounded area. See operation 350. The indication may, according to an example embodiment, comprise a directional indication which indicates where outside of the bounded area the location lies. For example, the directional indication may comprise an arrow which points in the direction of the location. According to another example embodiment, the indication may comprise a reduced-size, e.g., thumbnail, view of the bounded area and a portion of the surrounding area, and may further comprise an indication of the location within the surrounding area of the thumbnail view, such that a user may roughly ascertain where the location associated with the advertising content is located, relative to the bounded area. According to other example embodiments, the indication may be non-directional and/or may take any number of conceivable forms, such as a list of providers of goods or services associated with locations lying outside of the bounded area.

According to another example embodiment, the indication that the location lies outside of the bounded area may also convey various other information. For example, the indication may also or alternatively indicate whether one or more search results lie within the bounded area. In such an instance, the indication may further be a directional indicator which indicates where outside of the bounded area the search result(s) lies. Thus, according to an example embodiment, the apparatus 200 may include means, such as those discussed above, for causing a context indicator to be presented, the context indicator comprising an indication of whether (and, according to a further example embodiment, where) one or more locations associated with advertising content lie outside of the bounded area and whether (and, according to a further example embodiment, where) one or more locations associated with one or more search results lie outside of the bounded area. Thus, according to an example embodiment, a user who has entered a search query may be informed, via the context indicator, both whether a result of the search query is located within the bounded area and whether one or more locations associated with advertising content is located within the bounded area. According to a further example embodiment, if either or both of the search result or the one or more locations associated with advertising content lie outside of the bounded area, the user may be further informed, via the context indicator, as to where the search result and/or the one or more locations associated with the advertising content are located with respect to the bounded area.

According to a further example embodiment, the indication that the location lies outside of the bounded area may comprise a selectable element which allows the user to view an off-screen advertisement, e.g., to view advertising content comprising a location which lies outside the bounded area. Thus, the apparatus 200 embodied by or otherwise associated with the user device 101 may include means, such as the processor 202, the memory 208, the user interface 204 and/or the like for receiving selection of the selectable element and, in response, causing the bounded area to be modified such that the at least one location lies within the bounded area. See operation 360. The apparatus 200 may cause the bounded area to be modified, for example, by causing the bounded area to be enlarged, e.g., by causing a view of the graphical geographic representation to be zoomed out, or by causing the bounded area to be shifted. Once the bounded area has been modified so that the at least one location lies within it, the apparatus 200 may then cause at least a portion of the advertising content to be displayed and may cause a representation of the at least one location to be displayed, as discussed above. See operation 330 and 340.

The apparatus 200 may further include means, such as those discussed above, for causing, after the bounded area has been modified so that the at least one location lies within it, a selectable element to be presented for returning the bounded area to a previous state. The apparatus 200 may further include means, such as those discussed above, for receiving selection of the selectable element and, in response, causing the bounded area to be returned to the previous state, e.g., to the state before it was modified. This selectable element may, for example, be distinct from the selectable element which was used to modify the bounded area or it may, according to another embodiment, be the same selectable element, such that a user may use the same selectable element to toggle between viewing the off-screen advertisement and the original view.

As mentioned throughout the above descriptions, various operations and features of the MBA system may involve displaying content and/or receiving user input, such as via a user interface 204 of the apparatus 200. Thus, having discussed these various operations and features of the MBA system, reference will now be made to FIGS. 4-7 in order to discuss specific examples of graphical user interfaces which may be configured in accordance with various example embodiments to allow users to interact with the MAP system and enjoy the benefits of its various features and functions. Before proceeding, it should be understood that all of the depicted graphical user interfaces are only examples, and should not be interpreted as limiting the scope of the present invention.

Figure 4:
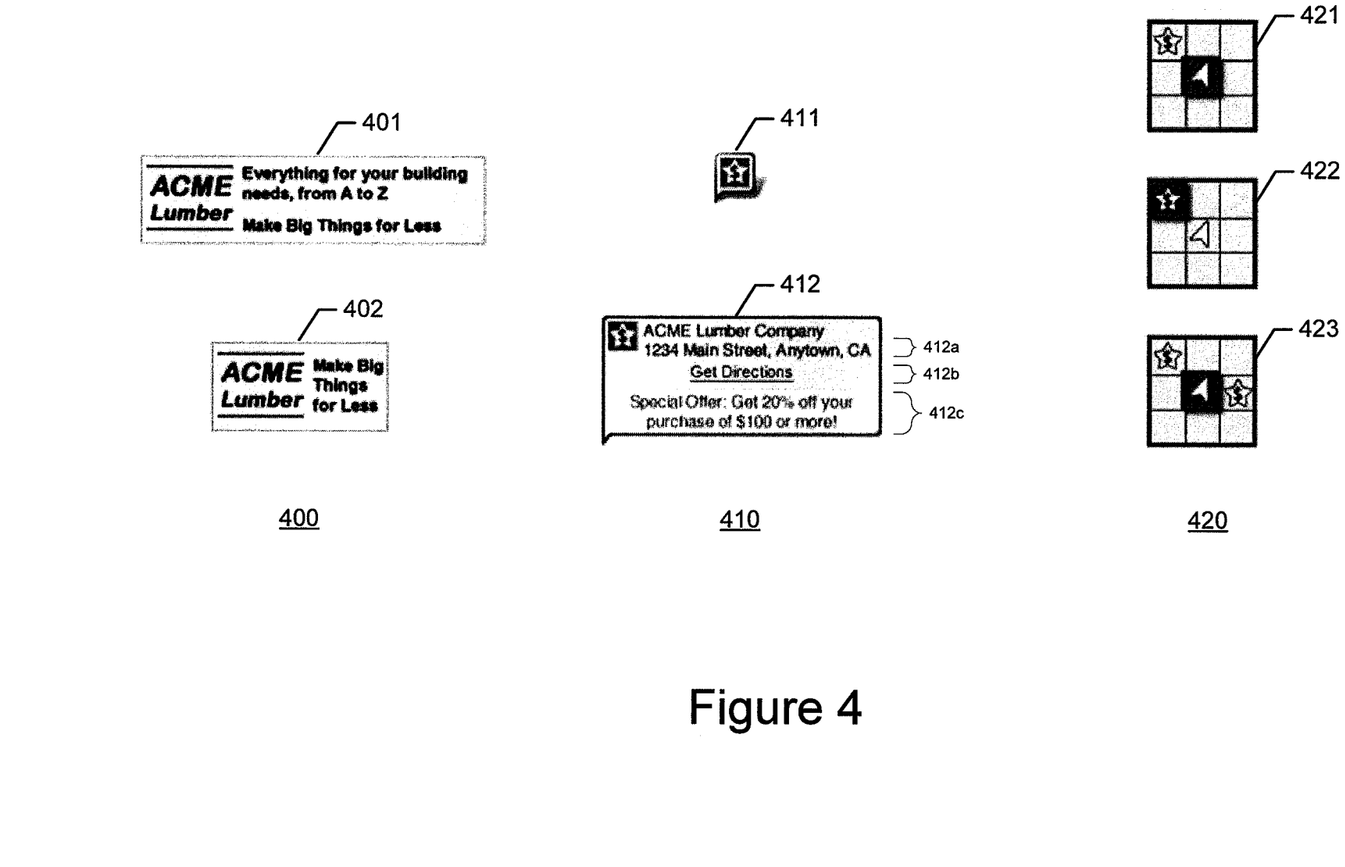
FIGS. 4 through 6 are schematic representations of user interfaces configured in accordance with example embodiments of the present invention.

FIG. 4 illustrates several examples of graphical advertising content 400, location identifiers 410, and context indicators 420. As discussed above, multiple versions of advertising content 400 may be provided and displayed. The advertising content 401 is an example of a full version, while the advertising content 402 is an example of a limited version. Multiple versions of location indicators 410 may also be provided, as discussed above. The location identifier 411 is an example of a limited identifier, while the location identifier 412 is an example of a full version. As shown, the full version 412 may include additional content and/or functionality, such as location information 412a, a selectable element for causing navigation information to be displayed 412b, and/or an offer 412c.

Examples of context indicators 420 are also depicted in FIG. 4. The context indicator 421 indicates that a search result is located within the bounded area and a location associated with advertising content is located outside of the bounded area. The context indicator 422 indicates that a search result is located outside of the bounded area and a location associated with advertising content is located within the bounded area. The context indicator 423 indicates that a search result is located within the bounded area while multiple (here, two) locations associated with advertising content are located outside the bounded area. As shown, the context indicators may, for example, depict the presence of a search result or location associated with advertising content within the bounded area via shading of an icon or other indicator associated therewith. Also as shown, the context indicator may be divided into sections to display wherein, with respect to the bounded area, a search result or location associated with advertising content is located. Thus, for example, if a location associated with advertising content is located northeast of the bounded area (assuming north is pointing upwards), an icon or other indicator indicative of the advertising content may be placed in an upper-right section of the context indicator. Each section of the context indicator may, according to an example embodiment, be individually selectable. Thus, according to the example embodiment, a user may select the upper-right section of the context indicator in an instance in which a location associated with off-screen advertising content is located northeast of the bounded area and, in response, the apparatus 200 embodied by or otherwise associated with the user device 100 may cause the bounded area to be adjusted so that the location associated with the off-screen advertising content is located within the bounded area.

Figure 5:
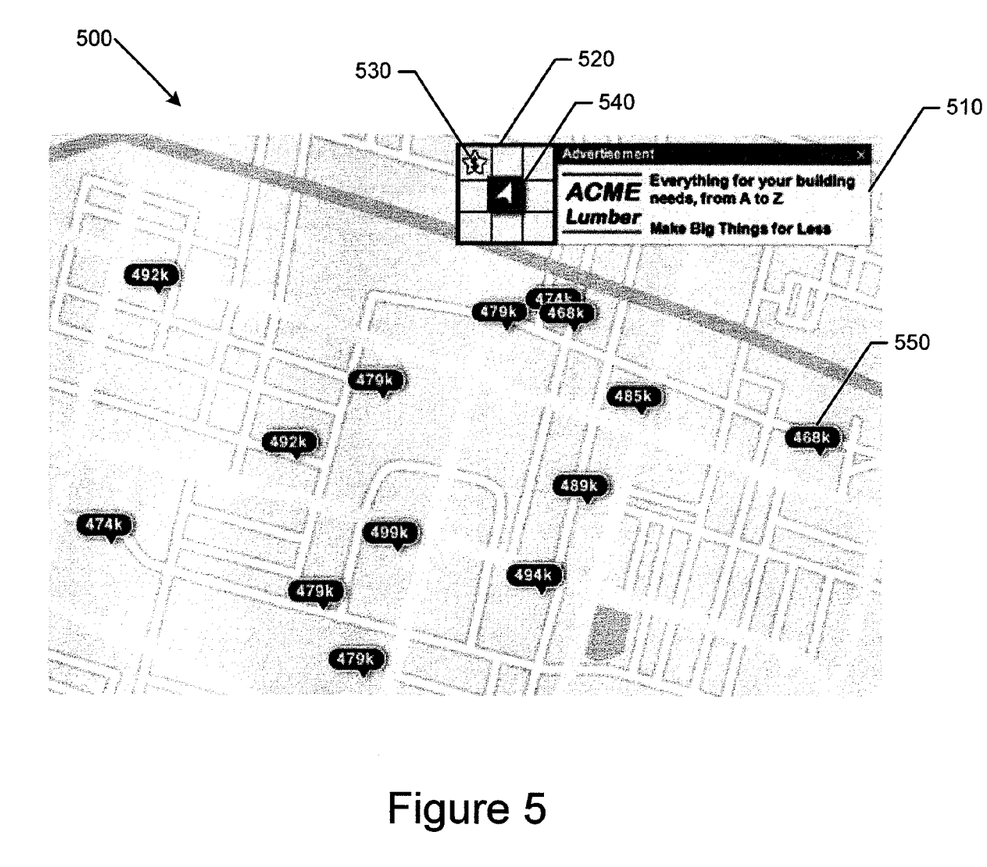

FIG. 5 depicts an example of a view of a graphical geographic representation of a bounded area 500 when a location associated with received advertising content lies outside of the bounded area 500. As can be seen, at least a portion of the advertising content 510 may be displayed proximate an edge of the bounded area 500. A context indicator 520 is also shown, and includes an indicator 540 that at least one search result 550 lies within the bounded area 500. The context indicator 520 further includes an indicator 530 that the location associated with the advertising content lies outside the bounded area 500. As discussed above, the indicator 530 that the location associated with the advertising content lies outside of the bounded area 500 may comprise a selectable element and the MBE system may be configured to, in response to receiving selection of the selectable element, cause the bounded area 500 to be modified such that the location lies within it.

Figure 6:
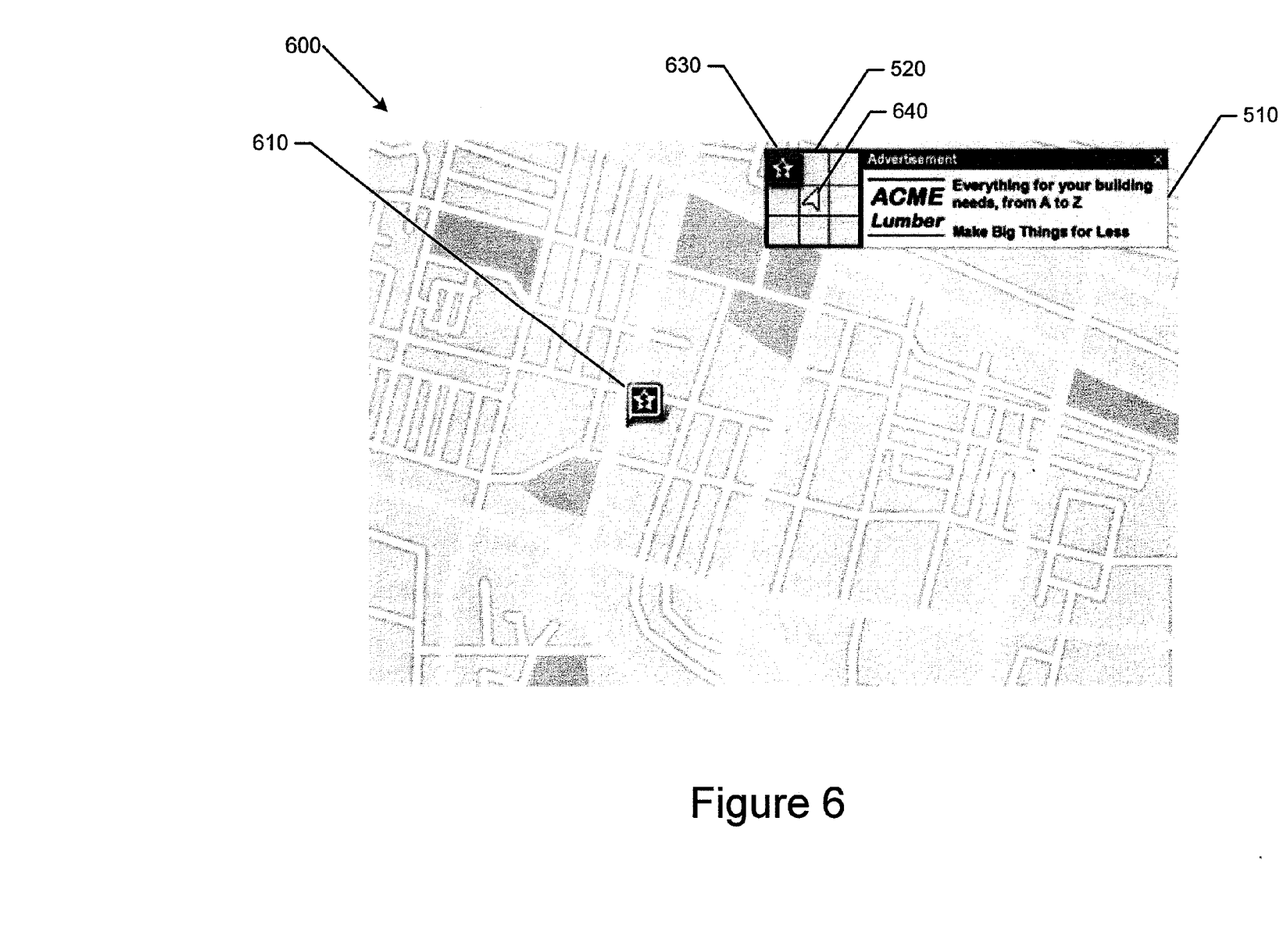

FIG. 6 depicts the bounded area after it has been modified 600 in response to receiving selection of the selectable element. As can be seen, the location associated with the advertising content is now located within the modified bounded area 600 and, accordingly, a location indicator 610 which is representative of the location is now depicted. As shown, the location indicator 610 is a limited version. As discussed above, the location indicator 610 may comprise a selectable element and the MBE system may be configured to, in response to receiving selection of the selectable element, cause a full version of the location indicator to be displayed. As is also shown, the context indicator 520 now includes an indicator 640 that search results are outside of the modified bounded area 600 and an indicator 630 that the location associated with the advertising content is located within the modified bounded area 600.

Figure 7:
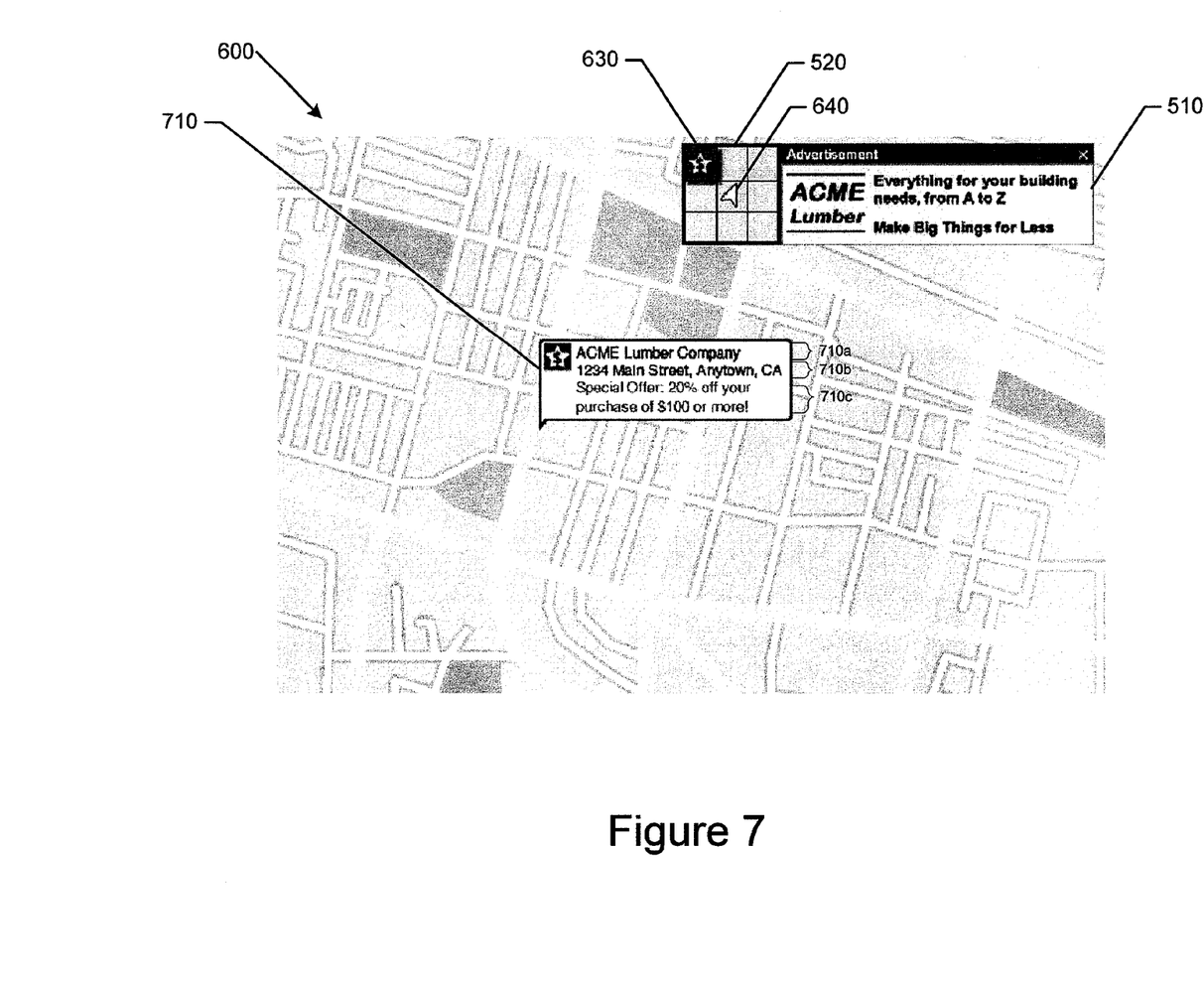
FIG. 7 is a schematic representation of indicators and/or user interface elements configured in accordance with an example embodiment of the present invention.

FIG. 7 depicts the same modified bounded area 600, but with a full version of the location indicator 710, which has been presented in response to receiving selection of the limited version 610 depicted in FIG. 6. As shown, the full version of the location indicator 710 may include additional information, such as contact information 710a, a selectable element for causing navigation information to be displayed 710b, and/or offers or deals 710c.

As described above, FIG. 3 illustrates a flowchart of an apparatus 200, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 208 of an apparatus 200 employing an embodiment of the present invention and executed by a processor 202 of the apparatus 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or enhanced. Furthermore, in some embodiments, additional optional operations may be included, some of which are shown in dashed lines in FIG. 3. Modifications, additions, or enhancements to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed:

1. A method comprising:
    causing display of a first window within a graphical user interface on a device, the first window comprising: (i) a graphical geographic representation of a bounded area, wherein the bounded area is an entirety of a map-based representation displayed on the graphical user interface at a given time, and (ii) an indication of advertising content, wherein the advertising content is associated with a location outside of the bounded area, the indication comprising a user-selectable element; and
    upon receiving selection of the user-selectable element, causing display of a second window within the graphical user interface on the device, the second window comprising (i) a modified bounded area, and (ii) the advertising content,
    wherein causing of the display of the second window comprises:

automatically modifying the bounded area to include the location associated with the advertising content.

2. The method of claim 1, the method further comprising:
receiving selection of the user-selectable element, and, in response:
causing the graphical user interface to be updated and the displayed bounded area to be modified such that the location lies within the bounded area; and
causing the user interface to be updated such that the indication of the at least the portion of the advertising content is repositioned in a position on the graphical geographic representation indicative of the associated location.

3. The method of claim 2, wherein causing the bounded area to be modified comprises causing the bounded area to be enlarged.

4. The method of claim 2, wherein causing the bounded area to be modified comprises causing the bounded area to be shifted.

5. The method of claim 2, further comprising, in an instance in which the bounded area has been modified such that the location lies within the bounded area:
causing a selectable element to be presented;
receiving selection of the selectable element; and, in response,
causing the bounded area to be returned to a previous state.

6. The method of claim 2, wherein automatically modifying the bounded area to include the location associated with the advertising content comprises zooming out such that the location lies within the bounded area.

7. The method of claim 1, further comprising: causing at least a portion of the advertising content to be displayed proximate an edge of the graphical geographic representation of the bounded area.

8. The method of claim 7, further comprising: causing at least the portion of the advertising content to be displayed proximate an edge of the graphical geographic representation of the bounded area which corresponds to a direction in which the location lies.

9. The method of claim 1, wherein the advertising content comprises a uniform resource locator (URL).

10. The method of claim 1, wherein receiving the advertising content comprises receiving the advertising content in response to detecting the initiation of a search session.

11. The method of claim 1, further comprising receiving further advertising content comprising a second location after a predetermined amount of time.

12. The method of claim 1, further comprising:
causing at least one selectable element respectively associated with the location to be presented;
receiving selection of at least one selectable element; and, in response,
causing navigation information regarding the location to be displayed.

13. The method of claim 1, wherein the indication of advertising content further indicates a direction of the location relative to the displayed bounded area.

14. The method of claim 1, further comprising:
causing display of a context indicator indicating: a) whether any locations having associated advertising content are located within the bounded area, and b) a general location of the location lying outside the bounded area.

15. A computer program product comprising a non-transitory computer readable storage medium storing program code portions therein, the program code portions being configured to, upon execution, direct an apparatus to at least:
cause display of a first window within a graphical user interface on a device, the first window comprising: (i) a graphical geographic representation of a bounded area, wherein the bounded area is the entirety of a map-based representation displayed on the graphical user interface at a given time, and (ii) an indication of advertising content, wherein the advertising content is associated with a location outside of the bounded area, the indication comprising a user-selectable element; and
upon receiving selection of the user-selectable element, cause display of a second window within the graphical user interface on the device, the second window comprising (i) a modified bounded area, and (ii) the advertising content,
wherein causing of the display of the second window comprises:
automatically modifying the bounded area to include the location associated with the advertising content.

16. The computer program product of claim 15, the apparatus being further directed to:
receive selection of the user-selectable element, and, in response,
cause the graphical user interface to be updated and the displayed bounded area to be modified such that the location lies within the bounded area; and
cause the user interface to be updated such that the indication of the at least the portion of the advertising content is repositioned in a position on the graphical geographic representation indicative of the associated location.

17. The computer program product of claim 16, wherein automatically modifying the bounded area to include the location associated with the advertising content comprises causing the bounded area to be enlarged or shifted.

18. The computer program product of claim 15, wherein the apparatus is directed to cause at least a portion of the advertising content to be displayed proximate an edge of the bounded area.

19. The computer program product of claim 15, wherein the indication of advertising content further indicates a direction of the location relative to the displayed bounded area.

20. An apparatus comprising at least one processor and at least one memory storing program code, the memory and program code being configured to, with the at least one processor, direct the apparatus to at least:
cause display of a first window within a graphical user interface on a device, the first window comprising: (i) a graphical geographic representation of a bounded area to be displayed on a user interface of a device, wherein the bounded area is the entirety of a map-based representation display on the user interface at a given time, and (ii) an indication of advertising content, wherein the advertising content is associated with a location outside of the bounded area, the indication comprising a user-selectable element; and
upon receiving selection of the user-selectable element, causing display of a second window within the graphical user interface on the device, the second window comprising (i) a modified bounded area, and (ii) the advertising content,
wherein causing of the display of the second window comprises:

automatically modifying the bounded area to include the location associated with the advertising content.

* * * * *